United States Patent [19]

Vincent

[11] Patent Number: 4,727,890
[45] Date of Patent: Mar. 1, 1988

[54] CIGARETTE AND LIGHTER HOLDER

[76] Inventor: John A. Vincent, 10600 SW. 146th Ave., Miami, Fla. 33186

[21] Appl. No.: 624,755

[22] Filed: Jun. 26, 1984

[51] Int. Cl.⁴ .............................................. A24F 15/10
[52] U.S. Cl. ...................................... 131/329; 211/87; 248/311.2
[58] Field of Search .......................... 131/329; 211/87; 248/311.2

[56] References Cited

U.S. PATENT DOCUMENTS 2,640,596 6/1953 Reeder .................................. 211/87
3,707,272 12/1972 Rasmussen ....................... 248/311.2

FOREIGN PATENT DOCUMENTS 2727780 1/1979 Fed. Rep. of Germany ...... 131/329

Primary Examiner—V. Millin
Attorney, Agent, or Firm—Jesus Sanchelima

[57] ABSTRACT

A holder for cigarettes and lighter including two compartments defined by two spaced apart parallel surfaces and a plurality of spacer member. An L-shape member is mounted to one of the surfaces and extends rearwardly and downwardly to engage between the glass and rubber lining of a typical vehicle's window.

5 Claims, 3 Drawing Figures

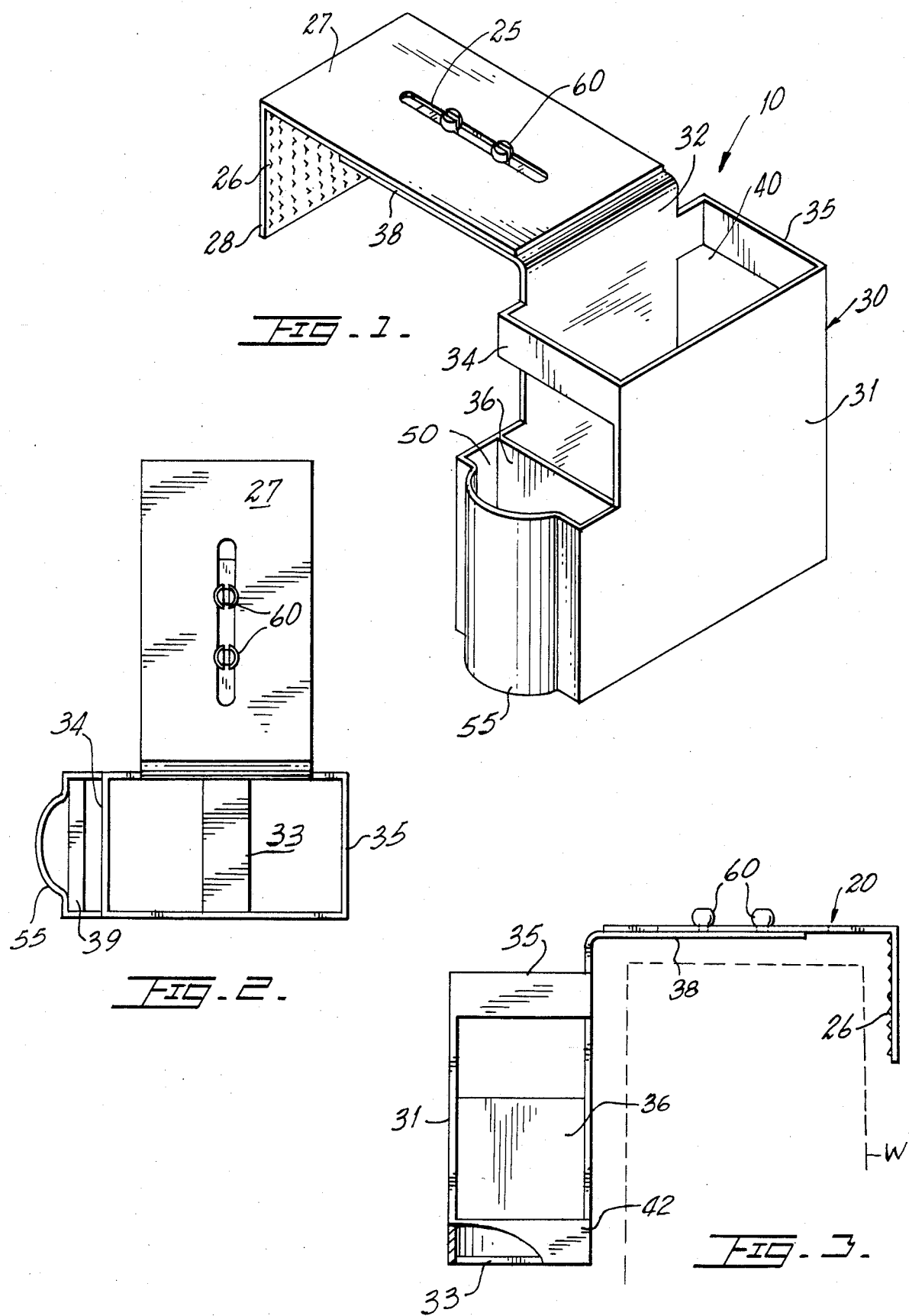

CIGARETTE AND LIGHTER HOLDER

BACKGROUND OF THE INVENTION

1. Field of the Invention.

The present invention relates to holders for cigarette packs and cigarette lighters and more particularly to such holders that are mounted to the glass-rubber interface of a vehicle's window.

2. Description of the prior art.

Applicant believes that the closest reference corresponds to U.S. Pat. Nos. 3,707,272 and 2,640,596, issued to Rasmussen and Reeder, respectively. However, they differ from the present invention because Rasmussen's device relies on the spring action of prong 16 and other differences concerning the manner in which the compartment for the cup is defined and, furthermore, Reeder's device is mounted to a fixed point by fastening means which is cumbersome to remove.

Other patents describing the closest subject matter provide for a number of more or less complicated features that fail to solve the problem in an efficient and economical way. None of these patents suggest the novel features of the present invention.

SUMMARY OF THE INVENTION

It is the main object of the present invention to provide a holder for cigarette packs and lighters that can be removably mounted on a vehicle's window in an area that does not obstruct the driver or passengers.

It is another object of this invention to provide a holder that may be securely mounted to a vehicle's window.

It is yet another object of this invention to provide a holder that is inexpensive to manufacture in quantity.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a view in perspective of the present invention.

FIG. 2 shows a top view of the present invention.

FIG. 3 illustrates a partially broken section with details of the interior.

DETAILED DESCRIPTION OF THE PREFERRED EMBODIMENT

Referring now to FIG. 1, where the holder is generally referred to by numeral 10 it can be observed that it comprises two detachable sections, in the preferred embodiment. One section being L-shape member 20 which includes longitudinal slot 25 on wall member 27 and wall member 28 includes ribbed surface 26 intended to provide a frictionally secured grip to the rubber gasket commonly found in automobile windows. Wall member 28 is designed to snuggly fit between the rubber gasket or lining and the glass itself.

The other section of the holder is a housing having a back wall 32 that has an integrally built extender member 38 that extends perpendicularly and rearwardly. Member 38 is provided with a cooperating longitudinal slot (not shown) through which friction screws 60 penetrate. Front wall member 31 is separated from, and is positioned parallel to, back wall member 32 by lateral spacers 34; 35 and 36. The outer surface of wall member 31 may contain an ornamentary feature or a commercial advertising. The bottom of the housing includes bottom surface members 33 and 39. A compartment divider/spacer member 36 is positioned in the same plane as lateral spacer 34, below it. The space defined by the planes of members 31; 32; 33; 34; 35; 36 and 42 are referred to as the larger or cigarette compartment 40.

Walls 31 and 32 extend beyond divider 36 and they terminate on lateral surface member 55 thereby defining, with the plane of member 39, lighter or small compartment 50. Lateral surface 55 has an archuated portion designed to accept commonly available round body lighters as well as those with rectangular cross-section.

The reason for surface 33 to only partially cover the bottom plane is that this way there is no accumulation of dirt and, also, it is easy to push up the cigarette pack from the bottom by inserting a finger through if it gets trapped or difficult to remove. A similar reasoning applies to surface 39.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A cigarette and lighter holder comprising:
   A. a housing defining two compartments having front and rear wall surface members in parallel planes that are spaced apart from each other by a plurality of lateral spacer members, including a compartment divider member dividing said two compartments vertically, and the outer lateral and bottom ends of said compartments being defined by said spacer members; and
   B. an L-shaped member, means for mounting said L-shaped on said rear wall, said L-shaped member being mounted rearwardly on said rear wall, with one of its legs pointing downwardly so that said compartments may be in an upright position.

2. The holder set forth in claim 1, wherein said housing further includes a rearwardly extending built-in extender member having means for fastening that cooperate with said L-shape member so that the distance between said leg of said L-shape member and said rear surface may be adjusted.

3. The holder set forth in claim 2 wherein one of said compartments is smaller that the other and said smaller compartment being terminated with a spacer member that includes an archuated surface so that non-rectangular lighters may be accommodated.

4. The holder set forth in claim 3 wherein said leg of said L-shape member has a ribbed surface in order to improve its frictional engagement to the typical vehicle's windows structure.

5. The holder set forth in claim 4 wherein the bottom of said compartment is defined by one spacer member of such dimensions that a user may insert his fingers upwardly to eject said cigarette pack.

* * * * *